United States Patent

Grodzins

(10) Patent No.: US 8,436,315 B1
(45) Date of Patent: May 7, 2013

(54) COMPACT THERMAL NEUTRON MONITOR

(75) Inventor: Lee Grodzins, Lexington, MA (US)

(73) Assignee: Thermo Scientific Portable Analytical Instruments Inc., Tewksbury, MA (US)

(*) Notice: Subject to any disclaimer, the term of this patent is extended or adjusted under 35 U.S.C. 154(b) by 293 days.

(21) Appl. No.: 12/372,058

(22) Filed: Feb. 17, 2009

Related U.S. Application Data (63) Continuation-in-part of application No. 10/861,332, filed on Jun. 4, 2004, now abandoned.

(60) Provisional application No. 60/476,101, filed on Jun. 5, 2003.

(51) Int. Cl.
*G01T 3/06* (2006.01)

(52) U.S. Cl.
USPC .................................................. 250/390.11

(58) Field of Classification Search ............. 250/370.11, 250/390.01–390.12, 391–395
See application file for complete search history.

(56) References Cited

U.S. PATENT DOCUMENTS

| | | | | |
|---|---|---|---|---|
| 5,223,717 | A * | 6/1993 | Charpak | 250/374 |
| 6,495,837 | B2 * | 12/2002 | Odom et al. | 250/390.11 |
| 6,529,573 | B2 * | 3/2003 | Olsher et al. | 376/153 |
| 6,566,657 | B2 * | 5/2003 | Odom et al. | 250/390.11 |
| 6,580,079 | B1 * | 6/2003 | Craig et al. | 250/390.05 |
| 2003/0178573 | A1 * | 9/2003 | Craig et al. | 250/390.04 |
| 2005/0224719 | A1 * | 10/2005 | Polichar et al. | 250/390.01 |

FOREIGN PATENT DOCUMENTS

| | | | |
|---|---|---|---|
| GB | 2 149 193 A | | 6/1985 |
| JP | 02114160 A | * | 4/1990 |

OTHER PUBLICATIONS

Stedman, "Scintillator for Thermal Neutrons Using Li6F and ZnS," Rev. Sci. Instrum., 31, 1156 (1960).

* cited by examiner

*Primary Examiner* — Kiho Kim
(74) *Attorney, Agent, or Firm* — Gordon Stewart (57) ABSTRACT

A thermal neutron monitor includes at least one neutron scintillator sheet interposed between light guides. Scintillation light emitted in opposite transverse directions is captured by the light guides and conveyed to a common detector. The sandwiched geometry of the monitor avoids the need to provide multiple detectors and permits construction of a relatively inexpensive, compact monitor.

14 Claims, 7 Drawing Sheets

COMPACT THERMAL NEUTRON MONITOR

RELATED APPLICATION

This application is a continuation-in-part of U.S. patent application Ser. No. 10/861,332 filed on Jun. 4, 2004 now abandoned entitled "Neutron and Gamma Ray Monitor", which claims the priority benefit of U.S. Provisional Application No. 60/476,101, filed on Jun. 5, 2003, the entire teachings of which are incorporated herein by reference.

BACKGROUND OF THE INVENTION

With the rise of terrorism there is a growing need for effective detectors for radioactive weapons of mass destruction, or materials used to shield their radiation form detection, e.g., high atomic weight elements. Three weapons of special concern are so-called "dirty bombs", uranium-based atomic bombs, and plutonium-based atomic bombs. For example, dirty bombs include chemical explosives surrounded by radioactive materials to be dispersed upon detonation, contaminating the surroundings. Dirty bombs can be detected by their emitted radiation, gamma and bremsstrahlung radiation being the most common signatures. Uranium-based atomic bombs can in principle be identified by the signature gamma rays of $^{235}$U or $^{238}$U. The radiation flux from weapons-grade $^{235}$U is low, and therefore excellent efficiency and good energy resolution is desirable to distinguish $^{235}$U or $^{238}$U signature gamma rays from background gamma rays and from innocent sources. Plutonium-based atomic bombs can be detected by neutron emission. Neutron emitters are sufficiently rare that the detection of a neutron source several times above neutron background levels can be prima facie evidence for the presence of plutonium.

The detection of gamma rays and neutrons has a long history dating from their discoveries. Many topical books and monographs are available, for example, "Radiation Detection and Measurement, Third Edition, 1999" by Glenn F. Knoll, Wiley Press", the entire teachings of which are incorporated herein by reference. Until recently, radiation detectors were used almost exclusively for benign commercial or research applications. Gamma ray devices with good efficiency and energy resolution have been available since NaI(Tl); the most widely used inorganic scintillator, was introduced in the late 1940's. There are now a number of inorganic and organic scintillators, as well as a number of semiconductor detectors that are commercially available for detecting gamma rays of low and high energy in configurations adapted for a variety of applications. Light from the scintillators can be detected by an optical detector, e.g., photomultipliers, photodiodes, and charge-coupled devices (CCDs) and the like. However, these detectors cannot detect gamma ray sources shielded by a sufficient mass of a high Z material, e.g., lead, tungsten, and the like. Commercial neutron detectors also became available in the early 1960s. These relatively bulky devices detect thermal neutrons with gas-proportional counters filled with either $BF_3$ or $^3$He. High energy neutrons can typically be measured by plastic and liquid scintillators that detect the highly ionizing protons produced when the energetic neutrons collide elastically with the hydrogen nuclei. The presence of fast neutrons can also be determined by thermalizing, or moderating the speed of the neutrons with a hydrogenous material, and detecting the resulting thermal neutrons with efficient thermal neutron detectors. Plastic and liquid scintillator containing lithium or boron are examples of detectors that employ this method.

SUMMARY OF THE INVENTION

Existing commercial radiation detectors do not meet existing radiological weapon detection needs, including selectivity, efficiency, portability, and detection of the three main types of radioactive weapons. Further, existing radiation detectors cannot detect gamma rays from a shielded weapon, for example, a weapon shielded by lead. Therefore, there is a need for effective detectors of radioactive weapons of mass destruction, including shielded weapons.

According to an illustrative embodiment of the invention, a compact thermal neutron monitor is provided having at least one sheet of thermal neutron scintillator material sandwiched between first and second light guides. Upon impingement of a thermal neutron, the scintillator sheet emits light in opposite transverse directions, such that a first portion of the scintillation light is directed to and coupled into the first light guide, and a second portion of the scintillation light is directed to and coupled into the second light guide. The first and second portions of the scintillation light are conveyed through the respective light guides to a common detector that responsively generates a signal representative of the intensity of the received light. In certain implementations, multiple scintillator sheets may be interleaved with corresponding light guides, such that some of the light guides may receive light from two scintillator sheets arranged on opposite sides of the light guide. By capturing and detecting scintillation light emitted in both transverse directions, the signal-to-noise ratio and hence the sensitivity of the thermal neutron monitor is improved relative to equivalent monitors of conventional design, wherein only the scintillation light emitted in one direction is captured and detected. Furthermore, the present design avoids the complexity and manufacturing cost arising from utilization of multiple detectors.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The various embodiments herein relate to methods and an apparatus for detecting targets, e.g., signatures of radioactive weapons such as neutrons and gamma rays, and high-Z materials, e.g., lead, tungsten, and the like, that can shield gamma ray sources from detection. The various embodiments described here are examples of many configurations of a "universal", portable, hand-held, terrorist-threat detector that can identify such targets. In various embodiments, detection is possible for one or more targets, such as: gamma rays, e.g., gamma rays characteristic of specific radioisotopes; neutrons characteristic of plutonium; and high atomic-weight (high Z) material that can shield radioactive, e.g., gamma ray sources. In some embodiments, a single handheld detector is employed to record evidence of these targets and alert the operator to their presence.

Figure 1:
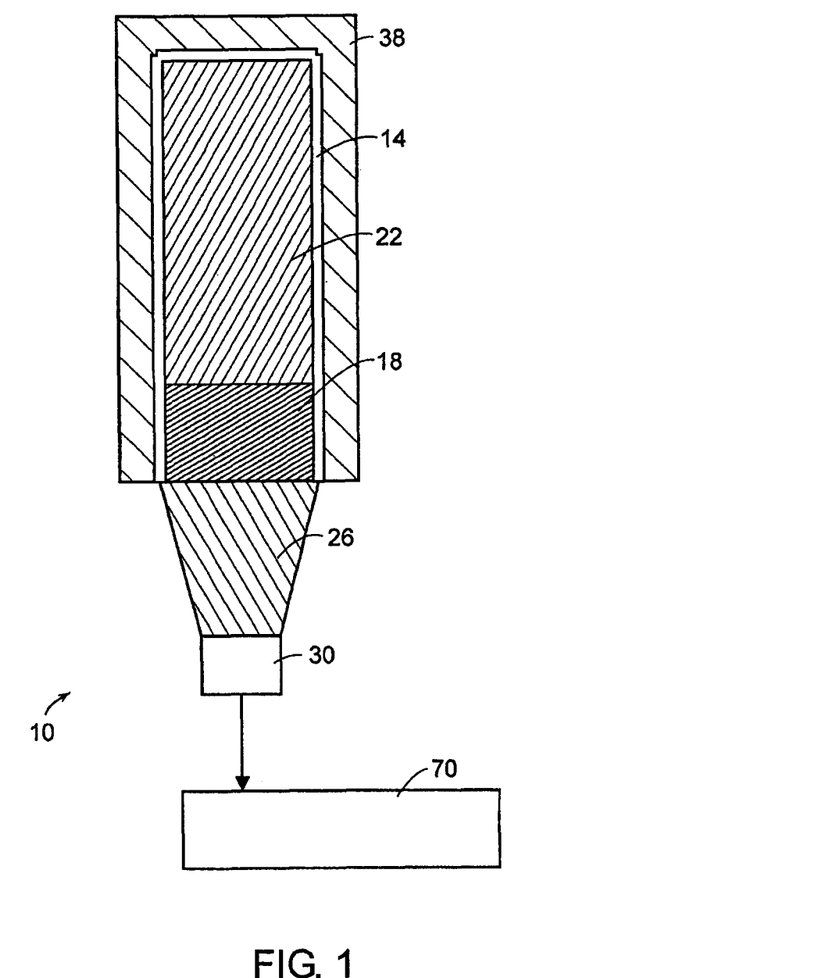
FIG. 1 depicts an embodiment of selective radiation detection apparatus 10 equipped to detect gamma rays and neutrons.

FIG. 1 depicts an embodiment of selective radiation detection apparatus 10 equipped to detect gamma rays and neutrons. Neutron scintillator 14 is coupled to light guide 22 and gamma ray scintillator 18. Optical detector 26 can be coupled to detect scintillation from neutron scintillator 14 and gamma ray scintillator 18. Also, the apparatus can optionally be covered by moderator 38, which can be a material that thermalizes fast neutrons. Detector 26 can be coupled through preamplifier 30 to a controller 70 which can provide data acquisition, control, display and output. Controller 70 can be easily adapted from electronic controllers known to the art for handheld radiation detection instrumentation, for example, the acquisition, control and display system in a commercial X-ray fluorescent unit (Xli, Niton LLC, Billerica, Mass.). Typically, apparatus 10 is adapted to be handheld, e.g., all components can be included in a single compact unit having a total mass less than about 2.5 kg, or more typically, less than about 1.5 kg.

As described herein, a gamma ray detector can be any gamma ray detector known to the art, for example, a solid state semiconductor detector, or gamma ray scintillator (e.g., 18) in combination with an optical detector (e.g., 26). Typically, the gamma ray detector includes a gamma ray scintillator. Of the disclosed embodiments where a gamma ray scintillator is described, other embodiments are contemplated where the gamma ray scintillator is replaced with a solid state gamma ray detector.

Neutron scintillator 14 can include a material that scintillates in response to fast neutrons, thermal neutrons, or a combination of materials that respond to both types of neutrons. As used herein, thermal neutrons are neutrons that have kinetic energy on the order of kT, where k is Boltzman's constant and T is temperature in Kelvin; fast neutrons are neutrons with kinetic energy greater that kT, typically much greater, e.g., in the range of thousands to millions of electron volts. Typically, the material of neutron scintillator 14 can have excellent efficiency for detecting thermal neutrons and negligible efficiency for detecting X-rays or gamma rays. This material can include a thermal neutron-capturing isotope coupled to a scintillation component that scintillates upon exposure of the capturing isotope to thermal neutrons. The capturing isotope can be any thermal neutron capturing isotope known to the art, for example, $^6$Li, $^{10}$B, $^{113}$Cd, $^{157}$Gd, and the like, generally $^6$Li or $^{10}$B, or more typically $^6$Li. The scintillation component can be any component known to the art to scintillation in response to the reaction products of thermal neutron capture by a capturing isotope, for example, the scintillation component can be ZnS. The material of neutron scintillator 14 can be any combination of capturing isotope and scintillation component, for example, a compound including at least one of $^6$Li, $^{10}$B, $^{113}$Cd, or $^{157}$Gd combined with ZnS. Typically, the neutron scintillator is a combination of $^6$LiF and ZnS. For example, in various embodiments, neutron scintillator 14 is a commercially available screen material (Applied Scintillation Technologies, Harlow, United Kingdom), approximately 0.5 mm thick made from a mixture of LiF and ZnS. The lithium is isotopically enriched $^6$Li, an isotope with a cross section of 940 barns for capturing a thermal neutron and immediately breaking up into a helium nucleus $^4$He and a triton $^3$H, with a total energy release of 4.78 MeV. The energetic alphas and tritons can lose energy in the ZnS causing it to scintillate with the emission of about 50 optical photons for every kilovolt of energy lost as the alphas and tritons come to rest. There can thus be a high probability that each captured neutron produces hundreds of thousands of optical light quanta.

Tests of $^6$LiF/ZnS screens have determined that they are selective for thermal neutrons over other radiation, e.g. gamma rays, X-rays, and the like, e.g., these screens have intrinsic efficiencies of about 50% for detecting thermal neutrons, while their efficiency for detecting gamma rays can be negligible, e.g. less than about $10^{-8}$. Selectivity for thermal neutrons versus gamma rays can reduce the rate of "false alarms" due to relatively common gamma ray sources (medical isotopes, radioactive sources in industrial testing equipment, and the like) in favor of valid alarms due to neutron emitters associated with weapons of mass destruction. This selectivity for detection of thermal neutrons versus gamma rays can be expressed as a ratio. In typical configurations, the thermal neutron to gamma ray selectivity is at least about 10,000:1, more typically at least about 1,000,000:1, and in some embodiments, at least about 10,000,000:1.

Optional neutron moderator 38 can be made of a material that thermalizes fast neutrons. One skilled in the art will know of many suitable moderator materials and can select a moderator material, thickness, and location to maximize neutron detection efficiency while minimizing any loss in efficiency for detecting gamma rays. For example, typical neutron moderators are hydrogenous materials such as water, organic solvents (alcohols, ethers (e.g., diethyl ether, tetrahydrofuran), ketones (e.g., acetone, methyl ethyl ketone), alkanes (e.g., hexane, decane), acetonitrile, N,N' dimethylformamide, dimethyl sulfoxide, benzene, toluene, xylenes, and the like) oils and waxes (e.g., mineral oil, paraffin, and the like), organic polymers (e.g., polyalkanes (e.g., polyethylene, polypropylene, and the like), polyesters, polyvinylenes (e.g., polyvinylchloride) polyacrylates (e.g., polymethymethacrylate), polystyrenes, polyalkylsiloxanes (e.g., poly dimethyl siloxane), and the like), composites or gels of water or organic solvents with polymers (e.g., water gels of gelatin, polyacrylic acid, hyaluronic acid, and the like), and many other such moderators known to the art.

For example, in some embodiments, moderator 38 can be made of an organic polymer, e.g., high density polyethylene, and can be placed over the apparatus 10 to moderate (thermalize) incoming fast neutrons, so that they can be efficiently captured by neutron scintillator 14. In other embodiments, moderator 38 can be a container that holds a suitably thick layer of a liquid moderator covering apparatus 10, for example, water, organic solvents, water gels, and the like. In various embodiments, the hydrogen nuclei in the neutron moderator can be enriched in the $^2$H isotope, i.e., the fraction of $^2$H in the moderator is above natural abundance level. In some embodiments, at least about 50%, more typically at least about 90%, or preferably at least about 95% of the hydrogen nuclei in the neutron moderator are the $^2$H isotope.

Light guide 22 can be coupled to neutron scintillator 14 to direct the scintillation to optical detector 26. Light guide 22 can collect scintillation photons from a relatively large scintillation surface area and direct them to the smaller area of the detector 26. This can result in a higher scintillation collection efficiency for a given detector surface area. Although other configurations are possible, the depicted configuration where light guide 22 can be parallel to the surface of scintillator 14 (which can be perpendicular to the detection surface of detector 26) provides a compact structure suitable for a handheld unit.

In addition to guiding scintillation photons to optical detector 26, light guide 22 can optionally serve one or both of the following additional functions.

First the light guide material can act as a moderator or thermalizer of the fast neutrons, thus slowing them to thermal energies so that they can be efficiently captured by neutron scintillator 14. Thus, light guide 22 can include any neutron moderator described above that can meet the transparency criterion, e.g., typically hydrogenous materials such as water, organic solvents, transparent organic polymers (e.g., polyacrylics, polystyrenes, polycarbonates, polyalkylsiloxanes) composites or gels of water or organic solvents with polymers, mineral oil, and the like. Typically, the material of light guide 22 can be a solid, e.g., an organic polymer, generally a polyacrylate, e.g. in some embodiments, polymethyl methacrylate. In various embodiments, the hydrogen nuclei in the material of light guide 22 can be enriched in the $^2$H isotope, i.e., the fraction of $^2$H in the moderator is above natural abundance level. In some embodiments, at least about 50%, more typically at least about 90%, or preferably at least about 95% of the hydrogen nuclei in the neutron moderator are the $^2$H isotope.

Second, the material of the light guide, described in the preceding paragraph, can have a finite efficiency for scintillating in response to fast neutrons, for example, when fast neutrons strike a hydrogen nuclei, the hydrogen nuclei can be scattered with sufficient energy to give an ionizing signal, which can be detected by optical detector 26. In some embodiments, light guide 22 functions as a fast neutron scintillator and thus encompasses neutron scintillator 14. Thus, in various embodiments, apparatus 10 can detect fast neutrons, thermal neutrons, or fast and thermal neutrons depending on the materials and selection of light guide 22 and neutron scintillator 14.

The gamma ray detector 18 can be any of a variety of gamma ray scintillators known to the art, e.g., sodium iodide doped with thallium (Na(Tl), cesium iodide doped with thallium (CsI(Tl)), bismuth germanate (BGO), barium fluoride (BaF$_2$), lutetium oxyorthosilicate doped with cesium (LSO (Ce)), cadmium tungstate (CWO), yttrium aluminum perovskite doped with cerium (YAP(Ce)), gadolinium silicate doped with cerium (GSO), and the like. For example, NaI(Tl) can be fast, efficient and inexpensive, but can be hygroscopic and is typically sealed against moisture. Non-hygroscopic crystals such as BaF$_2$, BGO or LSO, and the like, can also be employed. Such materials are typically selected to have good efficiency for detecting gamma rays from dirty bombs; for example, a 662 keV gamma ray from $^{137}$Cs (often cited as a radiological threat in a dirty bomb) can have more than an 80% absorption efficiency in a 2.5 cm (1 inch) thick crystal of LSO, which can produce about 10,000 detectable optical photons. Generally, the gamma ray scintillator includes one of NaI(Tl), CsI(Tl), BGO, BaF$_2$, LSO, or CdWO$_4$, or more typically, BGO, BaF$_2$, or LSO. In some embodiments, the gamma ray scintillator is BaF$_2$, and in other embodiments, the gamma ray scintillator is LSO.

In various embodiments, gamma-ray scintillator 18 and the light guide 22 are transparent to the optical wavelengths generated by any of the scintillation events. As used herein, the terms "transparent" and "transparency" refer to the transmittance per unit path length in a material of light, e.g., scintillation light. Typically, a material transparent to scintillation light transmits, per meter of material, at least about 90%, generally about 95%, and more typically about 98% of scintillation. Typically, the scintillation transmitted is in a range from about 400 nanometers (nm) to about 600 nm, generally from about 350 to about 600 nm, or more typically from about 300 to about 600 nm. Thus, in some embodiments, transparent materials (e.g., the light guides, the gamma ray scintillator, and the like) transmit about 95%/meter of scintillation between about 350 nm and about 600 nm, or more typically, transmit about 98% of scintillation between about 300 nm and about 600 nm.

In various embodiments, the respective refractive indices of the scintillator 18 and the light guide 22 can be in the same range, e.g., between about 1.4 to about 2.4, or more typically, between about 1.5 to about 1.8, and can generally be selected to be similar to minimize reflections at the interface between scintillator 18 and light guide 22.

Thus, in various embodiments, light guide 22 and/or gamma ray scintillator 18 are transparent to scintillation, which can benefit the efficiency of detection at optical detector 26. Further, it can allow the use of a single optical detector 26 because the light from multiple scintillation sources can be collected and delivered on the optical face of detector 26. For example, as depicted in FIG. 1, scintillation from thermal neutrons interacting with neutron scintillator 14 can travel through light guide 22 and gamma ray scintillator 18 to detector 26. In embodiments where light guide 22 can also function as a fast neutron scintillator, its scintillation can also travel through gamma ray scintillator 18 to detector 26, and thus scintillation from three sources (fast neutrons in light guide 22, slow neutrons in scintillator 14, and gamma rays in scintillator 18) can be detected by a single optical detector 26. Further, in some embodiments, alternate arrangements of these components can be possible, for example, the order of light guide 22 and gamma ray scintillator 18 can be reversed and gamma ray scintillation can travel from scintillator 18 through light guide 22 to detector 26.

In various embodiments, where two or more types of scintillation are detected at detector 26, they can be distinguished according to their temporal characteristics, i.e., as a function of time. For example, in embodiments of apparatus 10 equipped to detect fast neutrons, thermal neutrons, and gamma rays, controller 70 can be programmed to sort detected signals according to features of their temporal characteristics, e.g., rise times, decay times, and the like. For example, in some embodiments, employing polymethyl methacrylate for light guide 22 gives a fast neutron scintillation decay time of about 2 nanoseconds; employing LSO for scintillator 18 gives a gamma ray scintillation decay time of about 40 nanoseconds (20 times slower); and employing the $^6$LiF/ZnS in scintillator 14 gives a thermal neutron scintillation decay time of about 30 microseconds (about 15000 times slower than fast neutron scintillation decay and about 700 times slower than gamma ray scintillation decay). Standard rise-time detection circuits known to the art can easily distinguish such temporally separated signals, and thus multiple scintillation types can be sorted, typically unambiguously, by controller 70, to yield separate data, e.g., pulse height spectra for each scintillation type. Standard circuits known to the art can be employed by controller 70 which can be fast enough so that substantially all signals from multiple scintillation sources can be processed.

Figure 2:
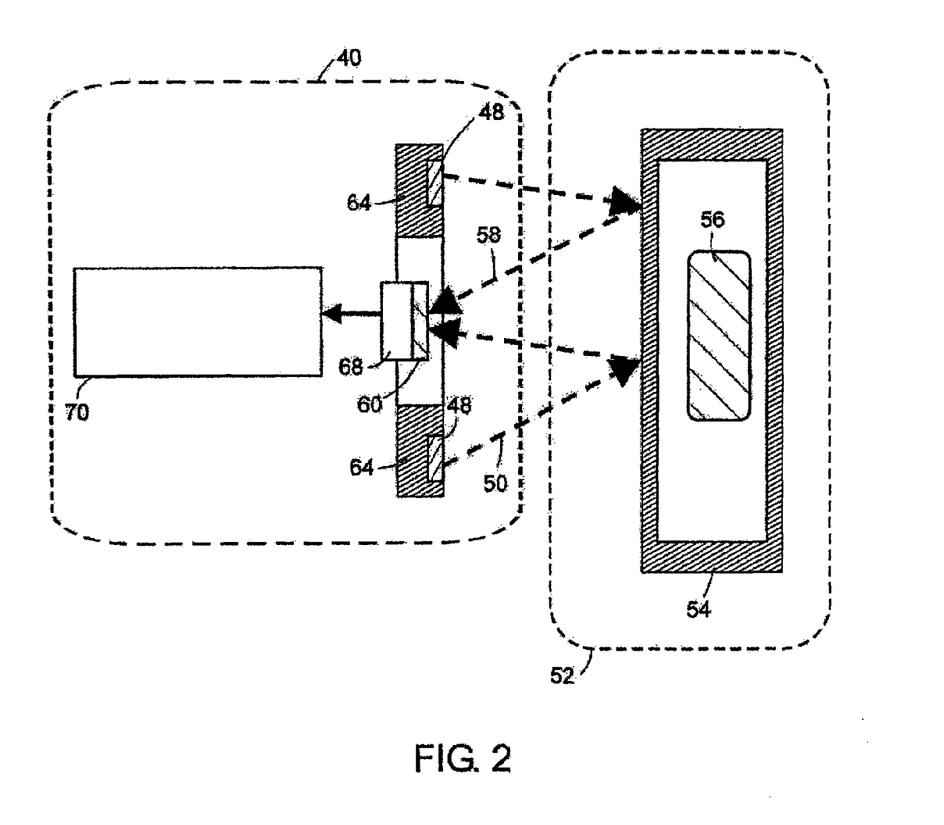
FIG. 2 depicts optional X-ray fluorescence (XRF) detector 40 coupled to controller 70 for detecting high atomic weight (high Z) materials 54 that can shield radioactive materials, e.g. gamma ray source 56.

FIG. 2 depicts optional X-ray fluorescence (XRF) detector 40 coupled to controller 70 for detecting high atomic weight (high Z) materials 54 that can shield radioactive materials, e.g. gamma ray source 56.

The XRF analyzer 40 can be easily adapted from commercial XRF detectors known to the art, for example, the Xli XRF analyzer, Niton LLC, Billerica, Mass. The XLi is a hand-held unit weighing less than 1 kg (2 pounds) that contains radioactive fluorescing sources, for example, it can contain a strong source of $^{57}$Co, which emits a 122 keV gamma ray that can excite the characteristic x-ray of various high-Z, heavy elements, including tungsten, lead, uranium, plutonium, and the like. Emitted X-ray fluorescence radiation can be detected in a detector, e.g., a cooled CdTe detector, which can have excellent efficiency and resolution for detecting the characteristic X-rays of high-Z materials. The processed information can be displayed, e.g., in a liquid crystal display. The collected information, including the pulse height spectra, can be stored in unit 70, can be telemetered to a remote location, and can automatically alert the operator to a potential hazard.

Thus, XRF analyzer 40 can optionally include a radioactive source 48 (typically encased in shield 64) to stimulate X-ray fluorescence in target materials, e.g., shield material 54 surrounding radioactive source 56 in bomb 52. For example, in one embodiment radioactive source 48 (depicted in FIG. 2 as optional dual sources) can be $^{57}$Co, which can emit 122 keV gamma rays in about 90% of its decays. The 122 keV gamma rays can be efficient exciters of the K X-rays of high atomic weight/high Z material 54 that can be suitable as shielding for radioactive source 56, for example, high Z materials such as tungsten, lead, uranium, plutonium, and the like. XRF analyzer 40 includes a detector 60, which can be any X-ray detector known to the art, for example in various embodiments detector 60 can be a CdTe (cadmium telluride) semiconductor detector, about 2 mm thick, coupled to a preamplifier 68. A 2 mm thick CdTe detector can have an intrinsic efficiency of more than about 80% for detecting the K rays of high atomic weight/high Z elements. The energy resolution of commercially available CdTe detectors can be greater than about 2 keV for 100 keV gamma rays, which can be sufficient to separate the K X-rays of various heavy elements and identify, at least in part, the elemental composition of the shielding material 54. One skilled in the art can determine that for some embodiments, a commercially available 100 mCi ring source of $^{57}$Co, together with a 1 cm$^2$, CdTe detector 2 mm thick, can determine the presence of a lead shield inside a container of steel up to 6.4 mm (¼ inch) thick, at a distance of one foot from the detector.

Each possible radiation detection combination is contemplated in various embodiments of the method and apparatus. For example, included in various embodiments are XRF and fast neutron detection; XRF and thermal neutron detection; XRF and gamma ray detection; XRF, fast neutron, and gamma ray detection; XRF, thermal neutron, and gamma ray detection; XRF, fast neutron, thermal neutron, and gamma ray detection; fast neutron and gamma ray detection; thermal neutron and gamma ray detection; fast neutron and thermal neutron detection; fast neutron, thermal neutron, and gamma ray detection; and the like. Further, each of these are contemplated in various embodiments as automatically controlled, e.g., by a single controller 70, and adapted for handheld operation, e.g., in a single handheld unit.

In other embodiments, one or more detectors can be coupled with controller 70 by an umbilical cord or a wireless communication link, and the like. For example, a single handheld apparatus can include a controller and an XRF analyzer combined with a gamma/neutron detector subunit; the subunit can be detached from the main unit containing the controller and the XRF unit, and can communicate with the controller via an umbilical cord or a wireless communication link. This can allow for more flexible detection usage, for example, a detachable gamma/neutron probe can be employed to search difficult to reach areas in vehicles or confined spaces.

Figure 3:
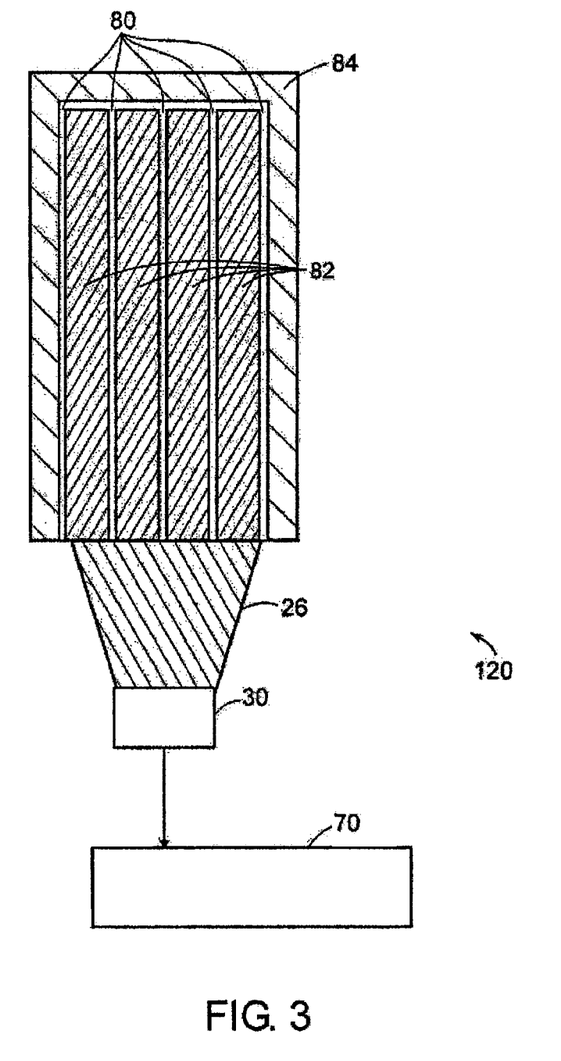
FIG. 3 depicts an embodiment of new neutron detector apparatus 120 employing a configuration of light guides 82 and thermal neutron scintillator layers 80.

FIG. 3 depicts an embodiment of a neutron detector apparatus 120 employing an alternating arrangement of light guides 82 and thermal neutron scintillator sheets 80. Each thermal neutron scintillator sheet 80 is sandwiched between a corresponding pair of light guides 82, such that one major surface of the thermal neutron scintillator sheet is positioned adjacent to a first light guide and the opposite major surface of the thermal neutron scintillator sheet is positioned adjacent to a second light guide. Light guides 120 are optically coupled to a common detector 26, which generates a signal representative of the intensity of light received thereby. Thermal neutron scintillator sheets 80 and light guides 82 may be flat planes, as depicted in FIG. 3, or may alternatively be curved along one or both major axes to assume (for example) a cylindrical or hemispherical shape.

Light guides 82 may be formed from any suitable material (or combination of materials) that is substantially transparent at the wavelength of interest, i.e., the wavelength of the light emitted by scintillator sheets 80 responsive to capture of a thermal neutron. If detection of fast neutrons is also desired, light guides 82 may be formed from or doped with a hydrogenous material that effects thermalization of fast neutrons passing therethrough so that the resultant thermalized neutrons can interact with thermal neutron scintillator sheets 80. In one illustrative embodiment, light guides 82 are fabricated from polymethyl methacrylate (PMMA).

As known in the art, thermal neutron scintillator sheets 80 may be formed from thin (~500 μm thick) sheets of $^6$LiF:ZnS, which are commercially available Applied Scintillation Technologies (Harlow, United Kingdom). The scintillator sheets 80 and adjacent light guides 82 may be physically bonded with a optically transparent layer of epoxy or other material that facilitates good optical coupling from the scintillator sheets to the light guides.

In operation, a thermal neutron captured by one of the thermal neutron scintillator sheets 80 will cause light to be simultaneously emitted in opposite transverse directions (the component of travel along an axis locally normal to scintillator sheet 80), such that a first portion of the emitted light will travel to and be coupled into the light guide 82 positioned adjacent to one of the major surfaces of scintillator sheet and a second portion of the emitted light will travel to and be optically coupled into the light guide 82 positioned adjacent to the opposite major surface. The sandwiched or layered geometry of neutron detector apparatus 120 advantageously permits capture and subsequent detection (by common detector 26) of substantially all the light produced by a thermal neutron capture event, thereby exhibiting improved signal-to-noise ratio (and lower limits of detection/quantitation) relative to prior art designs that capture and detect only a portion of the emitted light. Furthermore, neutron detector apparatus 120 removes the need to provide multiple detectors to detect scintillation light emitted in different directions, thereby avoiding the associated cost and space requirements and enabling the design of a relatively inexpensive and compact device.

Discrimination against signals arising from other forms of radiation, such as gamma rays, may be effected in neutron detector apparatus 120 by selection of a scintillator material that is substantially insensitive to radiation other than thermal neutrons and/or by filtering of the signal based on temporal characteristics to remove components of the signal attributable to non-neutron radiation.

Figure 4:
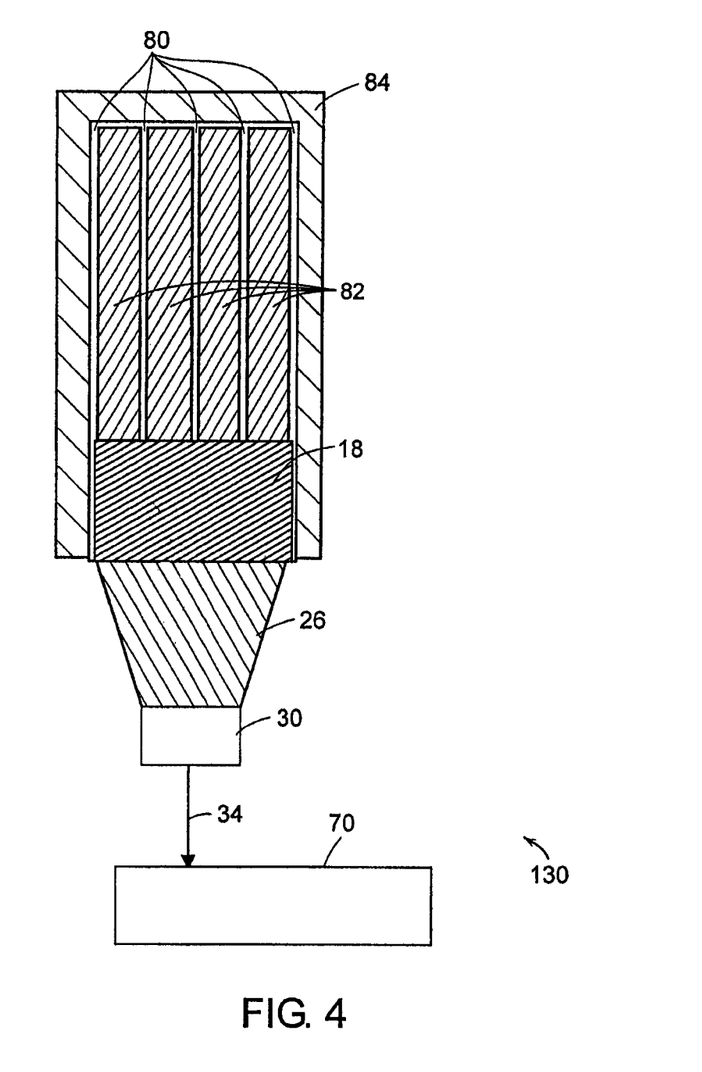
FIG. 4 depicts the components of an apparatus 130 for selective detection of neutrons and gamma rays viewed by a single optical detector 26.

FIG. 4 depicts the components of an apparatus 130 for selective detection of neutrons and gamma rays viewed by a single optical detector 26. In applications in which gamma ray and neutrons are desired to be detected separately, a gamma ray scintillation detector 18 can be attached to one end of the light guides/scintillators 80/82. The signals from the gamma ray detector and neutron detector are separated by their different temporal characteristics as described above. If the portion of apparatus 130 defined by light guides/scintillators 80/82 is long, for example, more than about 30 cm in length, it may be advantageous to put an optical detector on both ends of the combined gamma ray and neutron detector. The signals from two optical detectors can be added and the combined signal can be separately analyzed into neutron and gamma ray signals according to temporal characteristics as described above.

Further embodiments of the apparatus 130 can be useful for applications in which it is desired to detect fast neutrons. In some embodiments, the neutron scintillators 82 can be made out of a material, e.g., organic polymer, that scintillates in response to fast neutrons. In other embodiments, the $^6$LiF:ZnS neutron scintillator material can be suspended in a liquid scintillator, e.g., water, organic solvents, mineral oil, and the like, wherein the decay time of scintillation light emitted when a gamma ray or electron is detected can be significantly different from the decay time of scintillation light emitted when a fast proton (e.g., due to fast neutron scintillation) is detected. Since the two decay time constants of the liquid scintillator differ significantly from the decay time constants of the gamma ray detector 18 or light guides/scintillators 80/82, it can be possible to separate all four signals and therefore completely discriminate fast neutrons, thermal neutrons, and gamma rays using a single optical detector (or one or more optical detectors, the outputs of which are added together).

Figure 5:
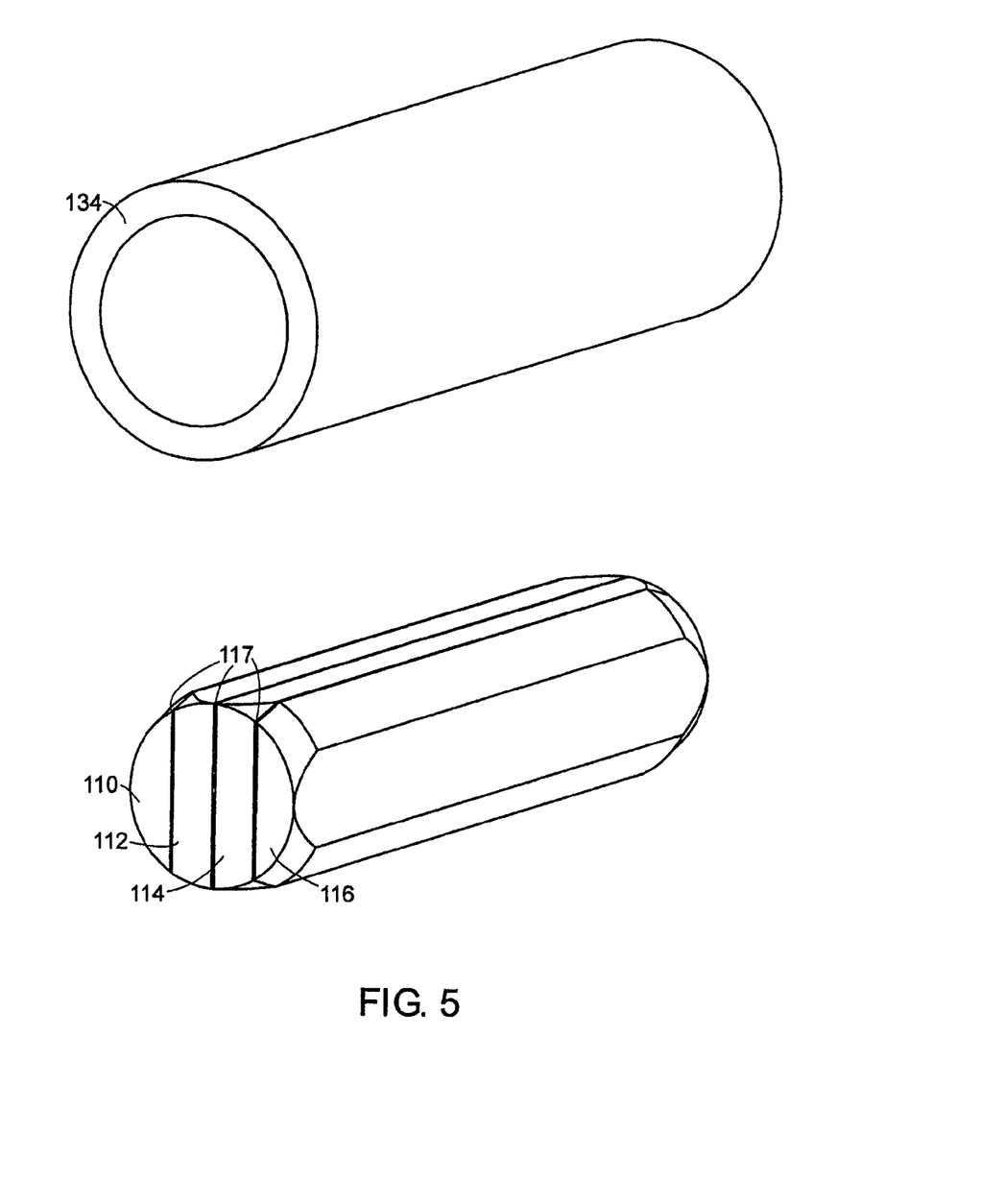
FIG. 5 depicts an isometric drawing of an embodiment of a new neutron scintillator/light guide apparatus 150.

FIG. 5 depicts an isometric drawing of an embodiment of a new neutron scintillator/light guide apparatus 150. Four sheets, 110, 112, 114 and 116 of optically transparent polymethyl methacrylate, about 5.1 cm wide by about 30.5 cm long by about 1.25 cm thick, polished on all sides, have thermal neutron scintillator material $^6$LiF:ZnS 116 layered between each 5.1 cm×30.5 cm side and on the top and bottom. The four slabs with their Li6F: ZnS screens make a multilayer sandwich, 150, 5.1 cm×30.5 cm by about 5.6 cm high. Apparatus 150 can be coupled to an optical detector, for example, apparatus 150 can replace neutron scintillators/light guides 80/82 in FIG. 4. As above, for applications that require very long detectors and/or detection of faint signals, it can be useful to attach a second optical detector, e.g., a photomultiplier tube, to each end of such a light guide/scintillator apparatus so as to increase the amount of light detected by employing two detectors.

Monte Carlo simulations, confirmed by experiment, show that polymethyl methacrylate can be about 75% as effective as high-density polyethylene for thermalizing neutrons. Thus, the neutron scintillator/light guide 150 can be an efficient neutron detector as shown. It can be made about 30% more effective by covering the length of the detector with a layer of neutron moderator 134, e.g., high density polyethylene, and still more effective by placing a layer of neutron-scintillator material between the light guide/scintillator 150 and the neutron moderator 134.

The neutron selectivity over gamma rays of light guide/scintillator 150 was measured at of $5\times10^8$:1. Commercial $^3$He gas proportional counters, the current "gold standard" of neutron detectors, have rejection ratios ranging from $10^3$ to $10^6$. Thus, the detector can have a gamma ray rejection ratio that is more than 1000 times greater than the best current commercial $^3$He detectors.

As noted above, selectivity for neutrons over gamma rays can be essential for detecting neutron sources, e.g., plutonium, while minimizing false alarms from gamma ray sources. For example, one current security standard desires a neutron detector to detect the presence of 0.455 kg (1 pound) of plutonium at a distance of 2 meters. 0.455 kg (1 pound) of plutonium emits approximately 20,000 fast neutrons per second. At 2 meters, there are at most 0.04 neutrons crossing per cm$^2$ of the detector per second. If the efficiency for detecting the neutron is 50%, which can be attained for light guide/scintillator 150, then the count rate is only 0.02/sec/cm$^2$. If the efficiency of the neutron detector for detecting gamma rays is $10^{-3}$, then 20 gamma rays/sec/cm$^2$, from a modest source, will give the same signal as the neutrons from 0.455 kg (1 pound) of plutonium, and trigger an alert. Neutron light guide/scintillator 150, with an efficiency for detecting gamma rays of only $2\times10^{-9}$, will typically not be alerted by modest gamma ray sources compared to the preceding security standard for neutron emission from plutonium. In fact, neutron light guide/scintillator 150, will typically not detect a gamma ray source as equivalent to the neutron/plutonium security standard unless the gamma ray source is itself a serious health risk.

The light guide/scintillator 150 has other practical advantages over conventional $^3$He detectors. Commercial $^3$He detectors typically have only about 10% efficiency for detecting neutrons unless surrounded by a thick neutron moderator such as a 5.1 cm thick cover of high density polyethylene. The disclosed neutron detectors, with intrinsic neutron moderation provided by the light guide, e.g., the polymethyl methacrylate light guides 110, 112, 114 and 116 in neutron light guide/scintillator 150, can have an efficiency of almost 40% without a high density polyethylene cover. Further, if necessary to achieve the efficiency of a fully moderated $^3$He detector, the disclosed neutron detectors can employ a much thinner moderator (e.g., polyethylene) to obtain full moderation. Thus, the detectors disclosed herein can be significantly lighter than a commercial $^3$He detector of the same efficiency, which is of central importance for adapting a device to handheld use.

Also, light guide/scintillator 150 can be very robust and can be free of travel restrictions. A $^3$He detector contains the isotope $^3$He at a pressure typically from about two to about four atmospheres. In many situations, transportation regulations require special procedures for transporting such detectors.

Also, commercial $^3$He detector are limited to an operating temperature range from +10° C. to +50° C., where detection can still be affected by changes in temperature. Light guide/scintillator 150 can be insensitive to temperature change over a range of at least about −10° C. to about 50° C.

Still another advantage is that the disclosed detector, in sizes large enough to meet Homeland Security requirements, can be less costly than commercial $^3$He detectors of comparable efficiency because the cost of comparable materials, e.g., the light guide material, are typically much less expensive compared to the cost of $^3$He in a conventional detector.

One skilled in the art will appreciated that many possible arrangements of one or more light guides and one or more neutron scintillation layers can be combined with an optical detector to form a neutron detector, for example, a neutron scintillation layer can be applied to the front of a block of light guide material, and an optical detector can be coupled to the back of the block of light guide material. However, arrangements of multiple layers of light guides and neutron scintillators in combination with one or more optical detectors as provided in FIGS. 3-5 are particularly effective as described above.

Figure 6:
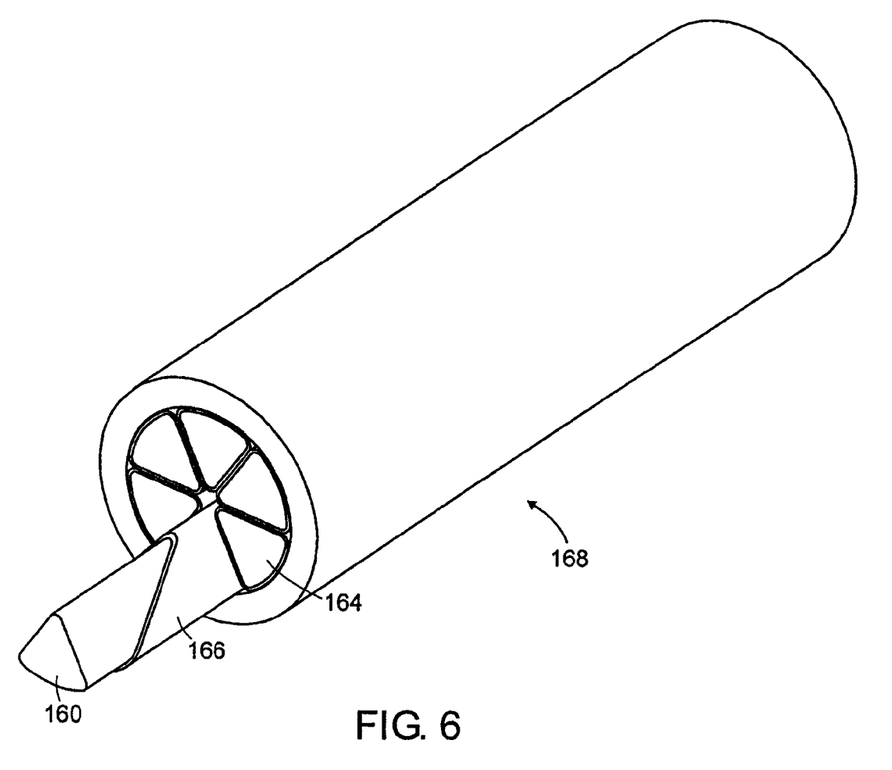
FIG. 6 depicts another embodiment of neutron scintillator/light guide apparatus 168 where multiple light guide segments 160 are employed to provide the neutron detector with directional capability.

FIG. 6 depicts another embodiment of neutron scintillator/light guide apparatus 168 where multiple light guide segments 160 are employed to provide the neutron detector with directional capability. Light guide segments 160 are arranged in the form of a hexagon 164 segmented into six pie-like sections. The $^6$LiF:ZnS thermal neutron scintillator material 166 can be applied to surround each light guide segment 160. Scintillation light collected from each segment, whether from fast neutron scintillation in the light guide material, thermal neutron scintillation in material 166, or both, can be detected separately, for example by employing a segmented optical detector, which is commercially available, or with separate optical detectors. The light collected at the different segments can be correlated with the direction of a neutron source, e.g., by appropriate modeling or by conducting calibration experiments. One skilled in the art will appreciate that the hexagonal segmentation shown in FIG. 6 is one of many configurations that can allow differential detection of scintillation based on the direction of the neutron source compared to the detector; for example, the arrangement of neutron scintillator material 80 and light guides 82 in FIG. 4 or 5 can have the same function.

Figure 7:
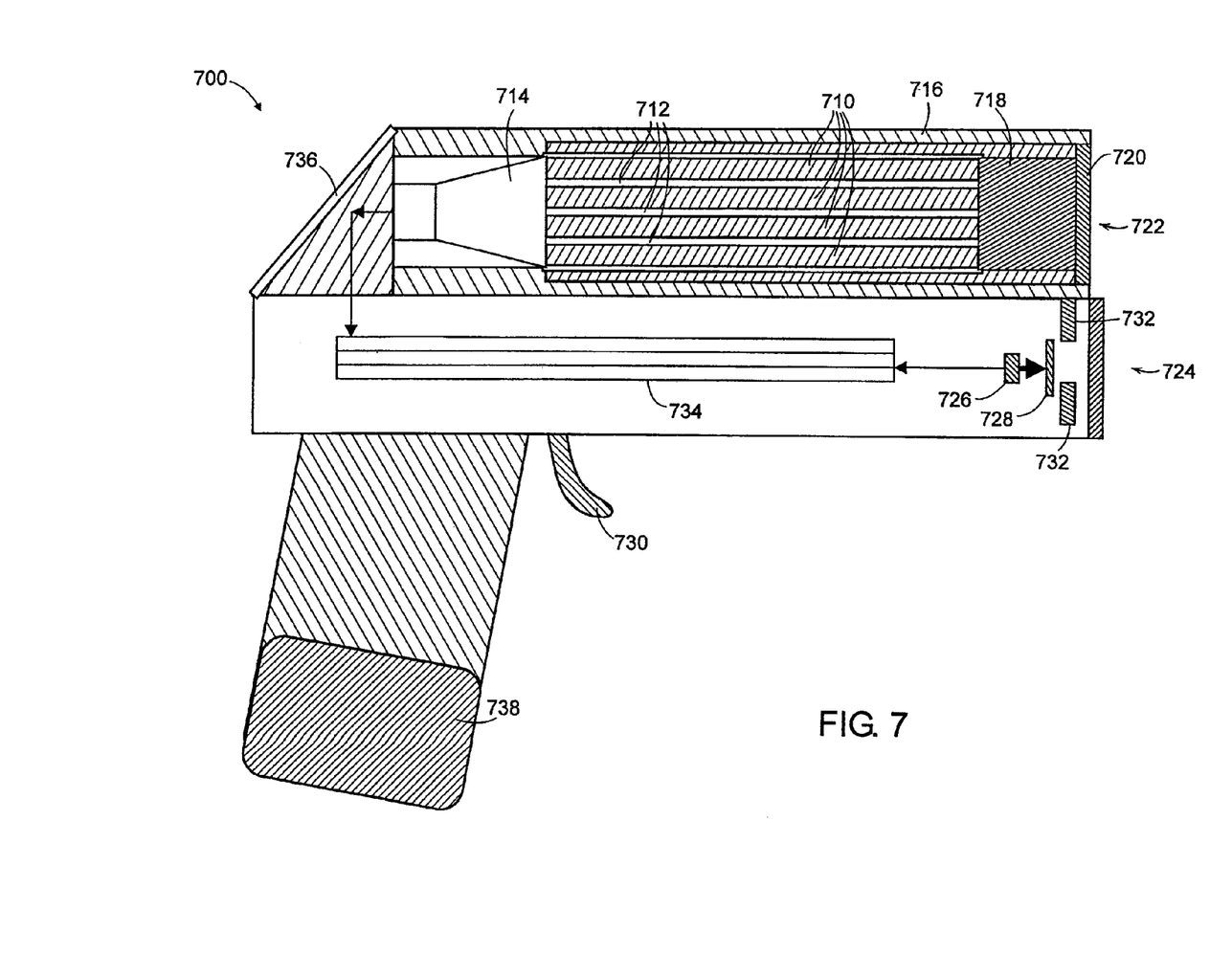
FIG. 7 depicts apparatus 700 in which neutron and gamma detectors and an -ray fluorescent analyzer are integrated with a controller into a single, compact unit adapted for handheld Homeland Security bomb detection.

FIG. 7 depicts apparatus 700 in which neutron and gamma detectors and an -ray fluorescent analyzer are integrated with a controller into a single, compact unit adapted for handheld Homeland Security bomb detection. Apparatus 700 which has been designed through experimental test and Monte Carlo computer simulation. Apparatus 700 includes a selective neutron detector that is insensitive to gamma rays; a selective gamma ray detector that is insensitive to neutrons; and an XRF detector capable of finding shielding material at least about 30.5 cm (12 inches) inside a box made of 3.1 mm (⅛ inch) steel.

The neutron detector, with overall dimensions of 5.1 cm by 5.1 cm by 25.4 cm, consists of 4 sheets of polished, transparent polymethyl methacrylate light guides 710, each 1.25 cm by 5.1 cm by 25.4 cm, with 0.43 mm thick $^6$LiF/ZnS neutron scintillators 712 covering all faces of guides 710 but the ends that are abutting the face of a 5.1 cm optical detector 714, which is a photomultiplier. The outside of the detector is covered by a neutron moderator 716 of 1.25 cm thick high-density polyethylene, which, together with the polymethyl methacrylate light guides 710, moderate incoming fast neutrons so that they are efficiently captured by $^6$LiF/ZnS neutron scintillators 712.

Gamma-ray scintillator 718 is a 5.1 cm diameter, 5.1 cm long single crystal of $BaF_2$, which can have a good efficiency for detecting gamma rays and a good energy resolution for identifying the emitting isotope. A thin window 720 of, for example, aluminum or plastic about 0.8 mm thick, in front of gamma-ray scintillator 718 and parallel to optical detector 714 can adapt the gamma detector to be sensitive to gamma radiation from 50 keV to several MeV. One skilled in the art will know how to select windows of other materials or thicknesses to adapt the gamma detector to other radiation ranges. In the depicted embodiment, scintillator 718 is located opposite detector 714 from guide/scintillators 710/712. (In other embodiments, higher energy resolution of the $BaF_2$ gamma scintillator 718 can be obtained by placing scintillator 718 between detector 714 and guide/scintillators 710/712. A thin layer of, of, for example, aluminum or plastic about 0.8 mm thick, can be placed as a band around the $BaF_2$ gamma scintillator 718, perpendicular to the face of detector 714.) The scintillation light from the $BaF_2$ is transmitted through light guides 710 to detector 714.

The signals from the $BaF_2$ gamma scintillator 718 are separated from those from the $^6$LiF/ZnS neutron scintillators 712 by their different decay times of 0.63 microseconds and ~30 microseconds, respectively.

The neutron/gamma assembly 722 is fitted as the top of a modified model XLp XRF analyzer 724 (Niton, ibid), which employs digitized pulse processing to analyze two detector 714 and XRF detector 726 simultaneously, storing the spectra and results of 4,096 channels data, all of which can be telemetered wirelessly to central command points.

XRF analyzer 724 uses a 100 mCi, well-shielded, $^{57}$Co source 726 that emits, when shutter 728 is opened by trigger 730, 122 keV gamma rays for exciting the characteristic X-rays of heavy-element shielding; the characteristic X-rays are detected in large-area CdTe detectors 732. The size of apparatus 700 is similar to that of a large cordless drill, with a weight of about 3 kg, including a battery power supply. A full battery charge can give up to 12 hours of continuous operation or more.

Controller 734 operates the detectors of apparatus 700 and displays radiation detection results on display screen 736. A portable power source 738, e.g., a battery or fuel cell, can be included.

In various embodiments each detector/analyzer can operate separately from each other or the controller via a modular design. For example, the neutron/gamma-ray detectors can be a detachable module from a base unit including the XRF analyzer and the controller, and the /gamma-ray detectors can communicate with the controller via an umbilical cord, wireless communication, and the like. Thus, the /gamma-ray detectors can be an entirely independent module or preferably can dock with the balance of apparatus 700. One skilled in the art can provide for such remote operation, for example, in the case of umbilical cord operation, employing suitable preamplifier circuitry or in the case of wireless operation, coupling off-the-shelf wireless communication modules with the controller and the XRF detector.

Government agencies can establish desired detection specifications, for example, for antiterrorism purposes, environmental monitoring, and the like. Various embodiments can meet one or more of the following specifications, including, for example:
1. Detect in 10 seconds, at a distance of 2 meters, an unshielded neutron source that emits 20,000 or more neutrons per second;
2. Detect in 10 seconds, at a distance of 2 meters, an unshielded, 10 μCi $^{137}$Cs source;
3. Identify a specific radioisotope based on emitted gamma rays; and
4. Detect high Z shielding up to 1 foot (30.5 cm) from the detector and behind as much as ¼" (6.4 mm) of steel or material with equivalent absorption.

While this invention has been particularly shown and described with references to preferred embodiments thereof, it will be understood by those skilled in the art that various changes in form and details may be made therein without departing from the scope of the invention encompassed by the appended claims.

What is claimed is:

1. A thermal neutron monitor, comprising:
   at least one thermal neutron scintillator sheet having opposed first and second major surfaces, the thermal neutron scintillator sheet emitting scintillation light in opposite transverse directions responsive to capture of a thermal neutron;
   first and second light guides respectively positioned adjacent to the first and second major surfaces of the thermal neutron scintillator sheet, wherein each of the first and second light guides receives a portion of the emitted scintillation light; and
   a common detector, optically coupled to the first and second light guides, for detecting the scintillation light conveyed thereto through the first and second light guides and responsively generating a signal representative of the intensity of the scintillation light.

2. The thermal neutron monitor of claim 1, wherein the at least one thermal neutron scintillator sheet comprises a plurality of thermal neutron scintillator sheets, each one of the thermal neutron scintillator sheets being positioned between a corresponding pair of light guides.

3. The thermal neutron monitor of claim 1, wherein the first and second light guides are formed from or doped with a hydrogenous material to thermalize fast neutrons incident thereon.

4. The thermal neutron monitor of claim 1, wherein the at least one thermal neutron scintillator sheet and the first and second light guides are generally planar.

5. The thermal neutron monitor of claim 1, wherein the at least one thermal neutron scintillator sheet and the first and second light guides are curved around a common axis to form a generally cylindrical shape.

6. The apparatus of claim 1, wherein the neutron scintillator comprises a thermal neutron capturing isotope component and a scintillation component that scintillates upon exposure of the capturing isotope to thermal neutrons.

7. The apparatus of claim 6, wherein the capturing isotope is selected from $^6$Li, $^{10}$B, $^{113}$Cd, and $^{157}$Gd.

8. The apparatus of claim 6, wherein the neutron scintillator comprises ZnS.

9. An apparatus for selective radiation detection, comprising:
   a plurality of plates of light guides;
   at least one sheet of neutron scintillator, sandwiched between two plates of light guides, the neutron scintillator being fabricated from a material that captures thermal neutrons and responsively produces optical light; and
   an optical detector optically coupled to the neutron scintillator by the light guides;
   a controller coupled to the optical detector;
   a gamma ray scintillator coupled to the optical detector; and
   an X-ray fluorescence analyzer.

10. The apparatus of claim 9, wherein the X-ray fluorescence analyzer is adapted for independent operation by umbilical cord or wireless communication.

11. The apparatus of claim 9, wherein the apparatus is adapted to be handheld.

12. The apparatus of claim 9, wherein:
   the X-ray fluorescence analyzer and the controller are part of a main unit; and
   the plurality of plates of light guides, the at least one sheet of neutron scintillator, the optical detector, and the gamma ray scintillator, are part of a subunit which can be detached from the main unit and can communicate with the controller by an umbilical cord or a wireless communication link.

13. A method for selectively detecting radiation, comprising the steps of:
   exposing a sheet of neutron scintillator to a source of neutron radiation, the neutron scintillator being fabricated from a material that captures thermal neutrons and responsively produces optical light;
   directing scintillation from the neutron scintillator to an optical detector through a plurality of plates of light guides adjacent to the neutron scintillator sheet, wherein the light guides thermalize fast neutrons so that they are captured by the neutron scintillator producing optical light, and wherein the light guides comprise a hydrogenous material that thermalizes fast neutrons;
   detecting the neutron scintillation by a controller coupled to the optical detector;
   exposing a gamma ray scintillator, coupled to the controller, to gamma rays;
   directing gamma ray scintillation to the optical detector;
   detecting the gamma ray scintillation;
   exposing an X ray fluorescence analyzer, coupled to the controller, to X-ray fluorescence evidencing a radioactive shielding material that includes a high atomic weight element; and
   detecting the X-ray fluorescence by the controller.

14. The method of claim 13, wherein the X-ray fluorescence analyzer is adapted for independent operation by umbilical cord or wireless communication.